United States Patent [19]
Young et al.

[11] Patent Number: 5,274,337
[45] Date of Patent: Dec. 28, 1993

[54] CLOCK SPEED LIMITER FOR A MICROPROCESSOR BY COMPARING CLOCK SIGNAL WITH A PREDETERMINED FREQUENCY

[75] Inventors: Ian Young; Keng L. Wong, both of Portland, Oreg.

[73] Assignee: Intel Corporation, Santa Clara, Calif.

[21] Appl. No.: 978,182

[22] Filed: Nov. 17, 1992

Related U.S. Application Data

[63] Continuation of Ser. No. 695,440, May 3, 1991, abandoned.

[51] Int. Cl.⁵ .................... H03K 9/06; H03D 3/00
[52] U.S. Cl. .................... 328/138; 328/134; 307/525; 307/362
[58] Field of Search ........... 307/522, 523, 524, 525, 307/526, 362; 328/133, 134, 138, 140, 141; 357/51

[56] References Cited

U.S. PATENT DOCUMENTS

| | | | |
|---|---|---|---|
| 3,659,116 | 4/1972 | Sellers et al. | 328/138 |
| 3,852,616 | 12/1974 | Carp et al. | 307/526 |
| 3,867,706 | 2/1975 | Gili | 328/141 |
| 4,496,858 | 1/1985 | Smith | 307/519 |
| 4,677,322 | 6/1987 | Burson et al. | 307/525 |
| 5,101,127 | 3/1992 | Simpson | 307/526 |

*Primary Examiner*—William L. Sikes
*Assistant Examiner*—Toan Tran
*Attorney, Agent, or Firm*—Blakely, Sokoloff, Taylor & Zafman

[57] ABSTRACT

A speed governor for a microprocessor which prevents the operation above a selected frequency. Three resistors in a bridge network are switched capacitor "resistors" controlled by the input clocking signal. The value of the fourth resistor of the bridge is selected through connections to bonding pads. The bridge through a comparator disrupts the microprocessor's operation. The bondings also permit selection of an oscillator range and phase gap in the internal clocking signals.

9 Claims, 2 Drawing Sheets

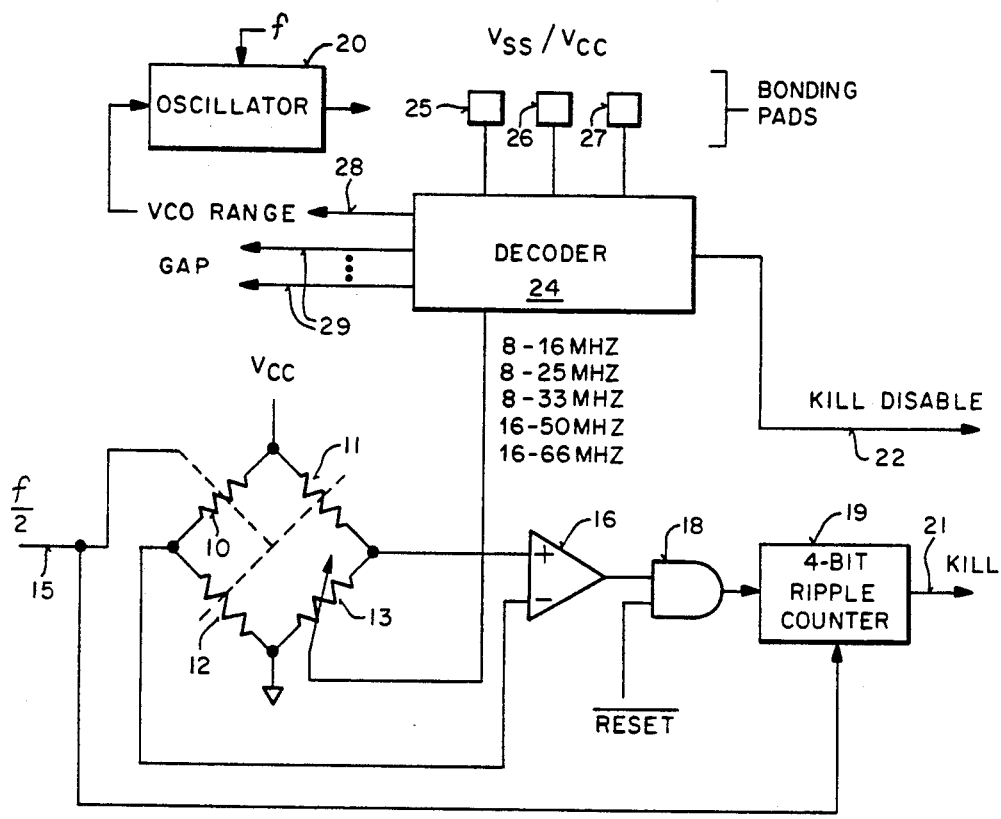
FIG_1
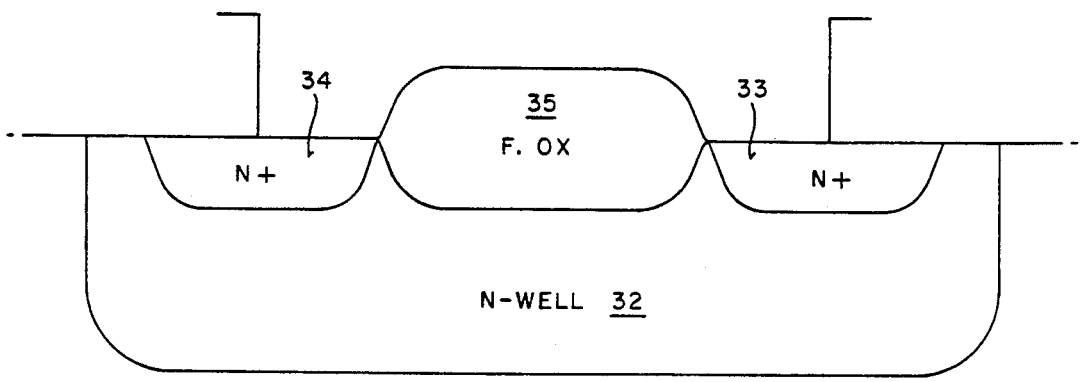
FIG_2

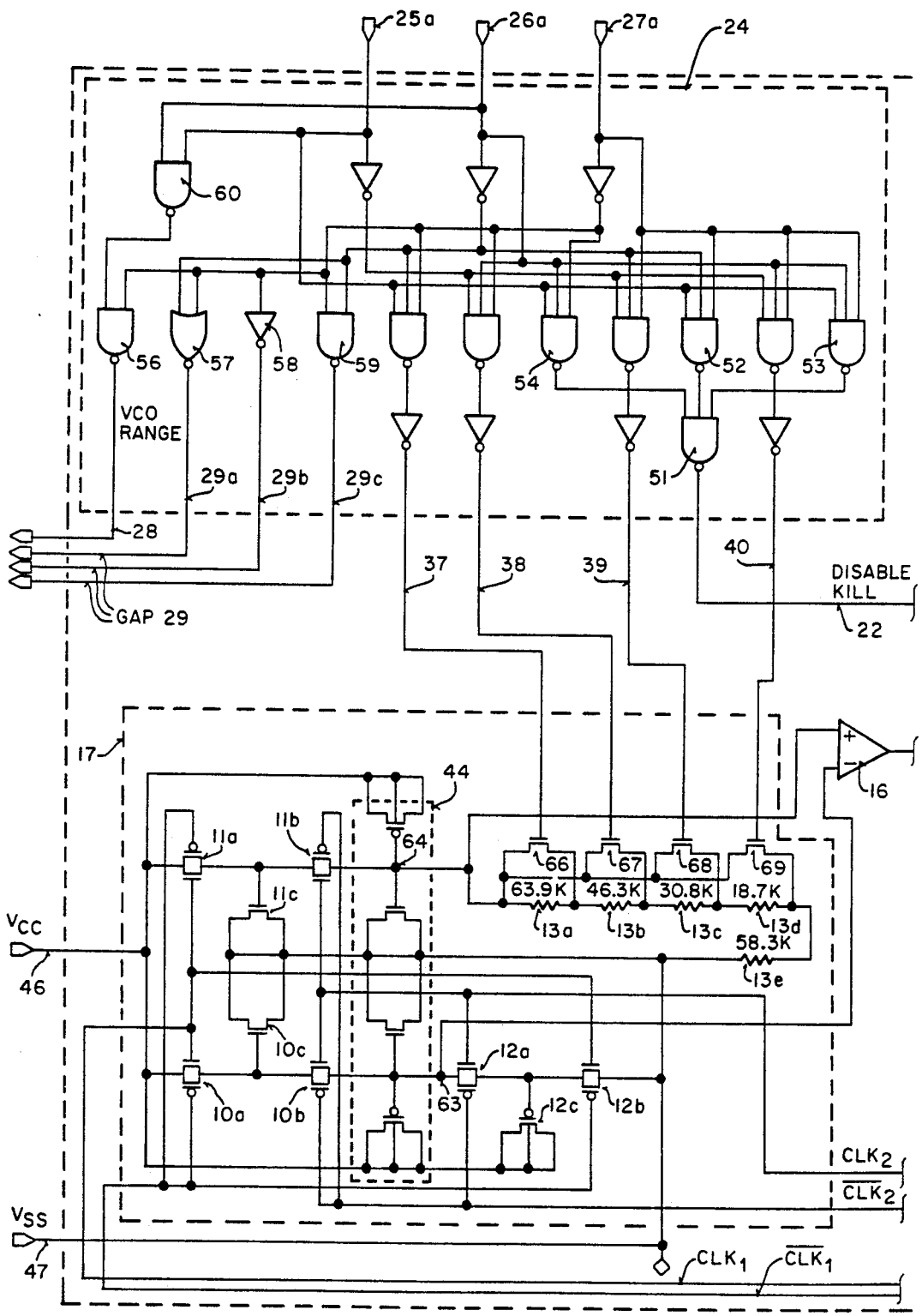
FIG_3

CLOCK SPEED LIMITER FOR A MICROPROCESSOR BY COMPARING CLOCK SIGNAL WITH A PREDETERMINED FREQUENCY

This is a continuation of application Ser. No. 07/695,440, filed May 3, 1991, now abandoned.

BACKGROUND OF THE INVENTION

1. Field of the Invention

The invention relates to the field of limiting the speed at which a computer may run and more particularly, the disabling of the operation of the computer when the input clock signal exceeds an upper limit.

2. Prior Art

In some computer systems, the need may arise to disable the computer when an input clock signal exceeds an upper limit. For instance, too fast a clock may cause problems in a system since some of the components in the system may not be able to operate at the higher frequency.

In the fabrication of microprocessors, it is common to find that some of the microprocessors are able to operate at higher frequencies than others even though all are fabricated with the same process. Process variations effecting, for example, the thickness of oxides can cause some wafers runs to yield parts that operate at much higher frequencies than in other wafers runs. Some companies test the upper frequency performance of newly fabricated microprocessors and sort them into "frequency" bins. Consequently, some microprocessors when sold, are graded (and labeled) for higher frequencies than others. The microprocessor may not function properly at frequencies above its labeled frequency, especially under stressful ambient conditions or marginal power supply potentials.

Companies have found that parts labeled with one frequency are sometimes relabeled after being sold by the manufacturer with higher frequencies, and then resold. These relabeled parts could end up in computer systems sold to operate at higher frequencies than the manufacturer intended. An innocent purchaser of such a computer could find that the computer operates well part of the time but fails at other times. The failures may be difficult to trace and if traced to the microprocessor, reflect badly on the manufacturer.

At least one manufacturer has incorporated a speed governor in its microprocessors which cause the microprocessors to fail if the clocking signals applied to them are higher than the frequency they were originally sold for. When this is done, the microprocessors can never be used in higher frequency application since it will never operate at the higher frequencies.

In co-pending application "Processor Clock Governor", Ser. No. 07/625,847, filed Dec. 11, 1990 and assigned to the Assignee of the present invention, a circuit is described for disabling a microprocessor when an improper frequency is used. A problem with this circuit is that the manner in which the "kill" signal is generated is itself subject to process variations and hence may not be settable with the precision desired.

As will be seen the present invention provides a circuit which is substantially independent of process variations and additionally provides other advantages.

SUMMARY OF THE INVENTION

An apparatus is disclosed which when employed in a microprocessor prevents the microprocessor from operating above a predetermined frequency. A resistor bridge-like circuit is used, three resistors of which are formed by switched capacitor circuits. The input clocking signal drives these resistors. The fourth resistor is selected to have one of a plurality of values; this selection occurs by connecting bonding pads to either ground or the power supply potential. The bonding pads are coupled to a decoder which selects one of a plurality of different resistance values for the fourth resistor. The resistive bridge is coupled to a comparator, the output of which after being coupled through a counter, provides a signal to disable the microprocessor if the input frequency is above the predetermined frequency. The counter effectively operates as a filter to prevent spurious signals from disrupting the operation of the computer.

The decoder also selects the range of the microprocessor's oscillator and the phase gap for timing signals.

BRIEF DESCRIPTION OF THE DRAWINGS

FIG. 1 is a block diagram of the present invention.

FIG. 2 is a cross sectional elevation view of a portion of a substrate which illustrates how certain resistors used in the present invention are fabricated.

FIG. 3 is an electrical schematic of the currently preferred embodiment of the present invention.

DETAILED DESCRIPTION OF THE INVENTION

An apparatus is described which disables a computer when the input clock frequency is above a predetermined frequency. In the following description, numerous specific details are set forth such as specific frequencies to assist in a thorough understanding of the present invention. It will be obvious, however, to one skilled in the art that the present invention may be used without these specific details. In other instances, well known circuits have not been described in detail in order not to unnecessarily obscure the present invention.

In its currently preferred embodiment, the apparatus of the present invention is employed in a microprocessor fabricated using complimentary metal-oxide-semiconductor (CMOS) technology. As will appreciated, the present invention may be used in any one of a plurality of microprocessors or for that matter, other circuits such as memories which are graded to operate at predetermined frequencies.

Referring to FIG. 1, three bonding pads 25, 26 and 27 are formed on the microprocessor's die. When the microprocessor is initially fabricated and the upper frequency limit determined, these pads are either coupled to ground ($V_{ss}$) or the power supply potential ($V_{cc}$). The specific bonding of these pads is discussed later in the application. Other means for making discretionary connections may be used in lieu of the bonding pads. For instance, programmable devices such as EPROMs fusible links, antifuses, etc. may be used.

The bonding pads 25, 26 and 27 are coupled to a decoder 24. This decoder decodes the potentials ($V_{cc}$ or $V_{ss}$) on the pads and thereby selects a value for the resistor 13. As will be seen, resistor 13 sets the upper frequency permitted for the microprocessor. By way of example, as shown in FIG. 1, the upper limit of the range 8-16 mHz through 16-66 mHz is selected with resistor 13. Once the bonding has been completed, a single resistance value for resistor 13 is selected and remains permanently part of the microprocessor, (i.e., not alterable by the user).

The decoder 24 also provides a signal on line 28 to the oscillator 20. Oscillator 20 is also formed on the substrate which includes the microprocessor and provides the timing for the chip. It receives the externally applied clocking signal. The binary 1 or 0 on line 28 determines the frequency range in which the oscillator 20 is optimized to operate. By way of example, the signal on line 28 may couple and decouple circuit elements into and from the oscillator so as to optimize the oscillators operation in the range between 8-33 mHz in one case, and from 16 mHz to an upper limit higher than 33 mHz in the other case.

A resistor, bridge-like network comprising resistors 10, 11, 12 and 13 provides inputs to the comparator 16. The resistance of resistors 10, 11 and 12 is a function of the frequency of the clocking signal applied to the microprocessor. This frequency, in the currently preferred embodiment, is halved and coupled on line 15 to a switched capacitor circuit which provides the resistors 10, 11 and 12. As is known, a switched capacitor circuit has a more predictable resistance in a semiconductor device since the value of the resistance is primarily determined by the frequency and the capacitance of a capacitor. Capacitance can be fairly well controlled in semiconductor processing since it is substantially determined by oxide thickness (as opposed, for example, to doping levels).

Generally, the frequency (of the switching) in a switched capacitor circuit is constant thereby providing a constant resistance value. The present invention makes use of the fact that the resistance varies with frequency. It is this variation in resistance which enables the apparatus of the present invention to detect frequencies which are above predetermined limits.

In FIG. 1 resistors 10 and 12 are coupled in series between $V_{cc}$ and ground, as are resistors 11 and 13. The node between resistors 10 and 12 is coupled to the negative input terminal of the comparator 16; the node between resistors 11 and 13 is coupled to the positive input terminal of this comparator.

The output of the comparator 16 is coupled through an AND gate 18 which passes the signal from the comparator except when the computer is being reset.

The output of the AND gate 18 is the count enable/reset input to a four bit ripple counter 19. The ripple counter 19 is clocked by the signal on line 15. The output of the counter (line 21) disrupts or kills the operation of the microprocessor. In the currently preferred embodiment, the signal on line 21 disrupts the operation of a microcode sequencer, hence, when the signal occurs the microprocessor ceases to operate. The counter 19 assures that a transient or spurious output from the resistive network does not disrupt the operation of the microprocessor. In effect, the counter 19 operates as a filter to assure uninterrupted service of the microprocessor except when the frequency is above the selected predetermined limit.

The resistor 13, in the currently preferred embodiment, comprises five resistors, 13a through 13e of FIG. 3. Each resistor 13a through 13e is fabricated in an n-type well formed in the silicon substrate such as well 32 formed in substrate 31 of FIG. 2. A field oxide region 35 is formed within the well 32 using well-known local oxidation processing. Spaced-apart n+ regions 33 and 34 (formed simultaneously with the doping of the source and drain regions for the n-channel devices of the microprocessor) are ion implanted to provide contact regions on opposite sides of the field oxide region 35. The resistance between regions 33 and 34 is determined by the n-well doping level and the separation between the regions. Different resistance values are obtained by changing the length of the field oxide region 35. As can be seen from FIG. 3, five different resistance values are used. The selection mechanism, described in conjunction with FIG. 3, enables the resistive network to provide five upper limits on frequency.

PREFERRED EMBODIMENT OF FIG. 3

The decoder 24 of FIG. 1 is illustrated within the dotted line 24 of FIG. 3. The pads 25, 26 and 27 are coupled to the lines 25a, 26a and 27a, respectively of FIG. 3. However, in the currently preferred embodiment, the signals on pads 25 and 27 are inverted before being applied to the lines 25a and 27a, respectively. The NAND gates 56 and 60 control the VCO range selection on line 28. The gates 57 and 59, and inverter 58 control the phase gap. Gates 52, 53 and 54 along with gate 51, control the disable-kill signal on line 22. Finally, the signals on lines 37, 38, 39 and 40 determine the resistance value for the resistor 13 of FIG. 1.

The decoder 24 of FIG. 3 implement the logic shown in the table below:

| DECODER LOGIC TABLE | | | | |
|---|---|---|---|---|
| LINES 25a, 26a, 27a SELECTION | SPEED (mHz) | LINES 29a, 29b, 29c GAP | PHASE GAP (MICROSECONDS) | VCO RANGE |
| 000 | 8-16 | 000 | 2.48 | LOW |
| 001 | 8-25 | 000 | 2.48 | LOW |
| 010 | 8-33 | 001 | 2.12 | LOW |
| 011 | 16 UP | 001 | 2.12 | HIGH |
| 100 | 16-50 | 011 | 1.9 | HIGH |
| 101 | 16 UP | 011 | 1.9 | HIGH |
| 110 | 16-66 | 111 | 1.74 | HIGH |
| 111 | 16 UP | 111 | 1.74 | HIGH |

The first column of the table represents the digital code on the lines 25a, 26a and 27a. By way of example, if the pads remain unbonded (default condition on ground to all three pads) the signal on lines 25a, 26a and 27b will be 101, respectively since as mentioned an inversion occurs for the pads 25 and 27. As is seen from the table, the 101 code permits an unlimited upper frequency. The gap code of 101 provides a phase gap of 1.9 nanoseconds. (This gap is the dead time between the two phases of the clocking signal used in the microprocessor and generated on-chip.) For the 101 code, the VCO or the oscillator range is in its high range. Examining the decoder for an input of 101, the inputs to gate 52 are all binary 1's hence the output of the gate will be low. This assures that the output of gate 51 is high providing the disable-kill signal on line 22. This signal prevents the output of the comparator 16 from disrupting the operation of the microprocessor. (The gates 53 and 54 likewise assure that for the input states of 011 and 111 the kill signal is disabled).

The circuit shown within the dotted line 17 provide the resistors 10, 11, 12 and 13 of FIG. 1. Resistor 10 comprises n-channel and p-channel transistors 10a, n-channel and p-channel transistors 10b, and the capacitor 10c. The transistors 10a are switched (on and off) by the clocking signal CLK1 and its complement. The transistors 10b are similarly switched by the clocking signal CLK2 and its complement. The clocking signals CLK1 and CLK2 are non-overlapping phased clocks operating at a frequency of one half the input clock frequency. The phasing of these clocking signals and their use in a switched capacitor network is well known, however with the present invention, the variation in frequency and its effect on the apparent resistance of the capacitor 10c (and also capacitors 11c and 12c) is used to detect shifts in frequency.

The resistor 12 of FIG. 1 is realized by the transistors 12a and 12b and the capacitor 12c. Note for this resistor, a p-channel device 12c is used for the capacitor. Again, the transistors 12a and 12b are clocked by the clocking signals in a manner similar to that of transistors 10a and 10b. The $V_{cc}$ potential as shown in FIG. 1 is applied to one terminal of the resistor 10. Resistors 10 and 12 are coupled in series with one end of resistor 12 being coupled to the $V_{ss}$ potential. (In the currently preferred embodiment, the potentials on lines 46 and 47 are somewhat filtered on chip before being applied to lines 46 and 47. This is done to remove noise which may effect the operation of the resistor network.) Note that the resistor bridge network used here inherently provides common mode rejection of noise, such as power supply noise. The common node of resistors 10 and 12 (node 63) is coupled to the negative input terminal of the comparator 16. The potential on this node is $V_{cc}/2$ and this potential is independent of the clock frequency. This provides a reference potential for the comparator that compensates for process and voltage variations. The capacitors shown within the dotted line 44 provide filtering for the potential on node 63.

In a similar manner, transistors 11a and 11b, and capacitor 11c form the resistor 11 shown in FIG. 1. This resistor (node 64) is coupled to a positive input terminal of the comparator 16. The potential on node 64 is filtered by the capacitors shown within line 44.

The resistor 13 of FIG. 1 is realized as resistors 13a through 13e. Resistors 13a through 13d are each associated with a transistor 66 through 69, respectively. These transistors enable the selection of the different values for resistor 13. By way of example, if transistor 67 conducts, resistors 13a and 13b are bypassed. Similarly, if transistor 69 conducts, resistors 13a through 13d are bypassed leaving only resistor 13e.

Assume that the potential on lines 25a, 26a and 27b is 000. Following through the logic of the decoder, the potentials on lines 37, 38, 39 and 40 will all be 0. For this case, the resistors 13a, 13b, 13c, 13d and 13e are in series. If the input clocking frequency is below or at 16 MHz, the potential on node 64 will be less than the potential on node 63 and no output will occur from the comparator 16. As can be seen from the table for code 001, the upper frequency limit is 25 mHz. Thus, an output from the comparator will not occur until this frequency is exceeded. However, as the frequency increases above 16 MHz, the resistance of the resistor 11 decreases, raising the potential on node 64. This causes the comparator to provide an output signal that prevents operation of the microprocessor.

Examining another case, assume the input code on lines 25a, 26a and 27b is 001. This will cause transistor 68 to conduct thereby lowering the resistance of resistor 13. This lowers the potential on node 64 such that resistor 11 may be switched at a higher frequency before the comparator switches state and the kill signal occurs.

As can be seen from the table for the first three codes (000,001,010), the signal on line 28 keeps the oscillator optimized for its lower range. Also as may be noted for the codes 000 and 001, the phase gap is maintained at 2.48 nanoseconds.

For the remaining codes, the oscillator is in the high range and for three of the codes 011, 101 and 111, there is no upper frequency limit. These three codes are used to select different phase gaps.

In practice, as discussed above, when a microprocessor is tested (typically probe testing) its upper frequency limit may be determined. (The actual testing may be done at a higher frequency than the microprocessor is graded for to assure a safety margin.) Then during packaging permanent bonding connects the appropriate code to the decoder. In some cases, the code is used to set the phase gap this being a function often of other considerations such as the system in which the part will be used (e.g., TTL vs. CMOS signal levels on buses, etc.).

Thus, an apparatus has been described which prevents a microprocessor from being used at a higher frequency than it is designated for and which also permits phase gap and oscillator ranges to be selected.

We claim:

1. In a microprocessor which operates under control of an input clocking signal and which is designated to operate when said input clocking signal is at a frequency which is within a first frequency range, a circuit for disabling the operation of said microprocessor when said frequency of said input clocking signal exceeds said first frequency range, said circuit comprising:
   a switched capacitor network having at least a first resistance which is a function of said frequency of said input clocking signal, said network being coupled to receive said input clocking signal;
   a resistor means for providing a second resistance, said resistor means being settable to one of a plurality of constant resistances, and is set to one of said plurality of constant resistances based on said first frequency range;
   comparator means having a first input coupled to said network and a second input coupled to said resistor means for comparing said first and second resistances, said comparator means responding to a change in said first resistance by providing a disable signal for disabling said microprocessor when said frequency of said input clocking signal exceeds said first frequency range.

2. The circuit defined by claim 1 wherein said resistor means is set using a programming means for providing said second resistance.

3. The circuit defined by claim 2 wherein said programming means provides a signal within said microprocessor for selecting an oscillator range.

4. The circuit defined by claim 2 wherein said programming means provides signals governing a phase gap in timing signals used in said microprocessor.

5. In a semiconductor device which operates under control of a clocking signal having a first frequency, and which is designated to operate when said first frequency is within a predetermined frequency range, an apparatus for providing a first signal when said first frequency of said clocking signal applied to said semiconductor device exceeds said predetermined frequency range comprising:

comparator means having first and second inputs for providing said first signal when an input signal coupled to said first input of said comparator means exceeds a certain limit;

said certain limit being a function of a first resistor means coupled to said second input of said comparator means wherein said input signal coupled to said first input of said comparator means is a function of a second resistor means;

said first resistor means for providing a first resistance, wherein said first resistor means is settable to one of a plurality of constant resistances, and is set to one of said plurality of constant resistances based on said predetermined frequency range;

said second resistor means comprising a switched capacitor network coupled to receive said clocking signal, while providing a second resistance which varies with said first frequency of said clocking signal.

6. The apparatus defined by claim 5 wherein said first resistor means comprises at least one resistor formed in a well disposed in said semiconductor device and two spaced-apart regions of the same conductivity type as said well, said regions being separated from one another by a field oxide region.

7. The apparatus defined by claim 5 wherein said first resistor means is programmable such that said first resistance may have one of a plurality of predetermined values.

8. The apparatus defined by claim 7 wherein said first resistor means comprises bonding pads to which discretionary connections can be made.

9. The apparatus defined by claim 8 wherein said first resistor means includes a decoder coupled to said bonding pads, said decoder providing a signal within said device which prevents the output of said comparator means from disabling said device.

* * * * *